Sept. 9, 1930.  D. WHITTIER  1,775,447
COOKED FOOD CONTAINER
Filed June 13, 1928

Inventor
Donald Whittier
By Lyon & Lyon
Attorneys

Patented Sept. 9, 1930

1,775,447

UNITED STATES PATENT OFFICE

DONALD WHITTIER, OF BEVERLY HILLS, CALIFORNIA

COOKED-FOOD CONTAINER

Application filed June 13, 1928. Serial No. 285,170.

This invention relates to cooked food containers and is more particularly related to a container adapted to receive cooked food to retain the heat of the food and which food container is of simple and inexpensive construction enabling the same to be used in the sale of food previously cooked at a central location, such, for example, as at a delicatessen and carried by the purchaser wherever desired, the construction of the food container being such as to maintain the heat of the food within the food and permit the carrying of more than one article of food.

An object of this invention is to provide a container for food products which is adapted to receive a plurality or multiplicity of separate food containers in such a manner as to insulate the food containers to maintain the heat within the food and also to provide such a food container that is of inexpensive construction and may be carried from a point of central distribution of the food to a point where it is to be used.

Other objects and advantages of this invention it is believed will be apparent from the following detailed description.

Figure 1:
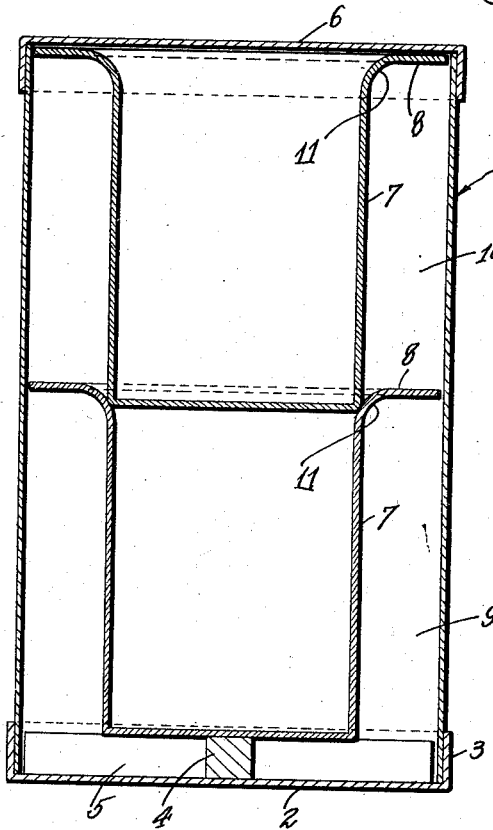
Figure 1 is a sectional elevation of a food container embodying this invention.
Figure 2:
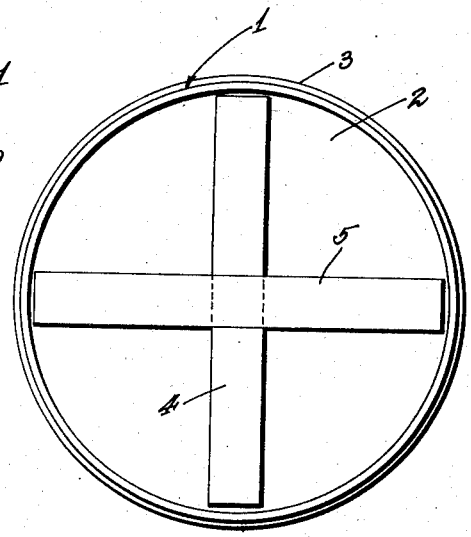
Figure 2 is a top plan view thereof with the individual food containers and the cover of the container removed.
Figure 3:
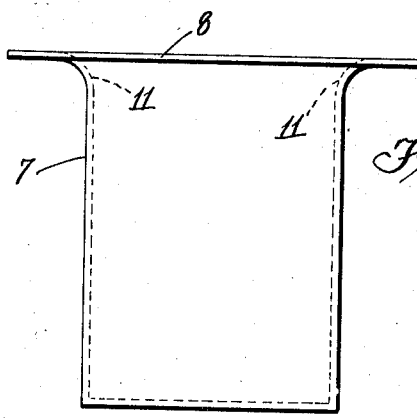
Figure 3 is a detached elevation of an individual food container as embodied in this invention.

In the preferred embodiment of this invention illustrated in the accompanying drawings 1 indicates a tube which may be of any suitable or desirable construction, and is preferably formed of card-board or like material. The tube 1 is provided with a bottom 2 having a flange 3 which fits the end of the tube 1. Mounted within the bottom 2 are a pair of cross members 4 and 5 which may be formed of wood or any suitable or desirable insulating material such, for example, as cork or balsam wood. A cover 6 exactly similar to the bottom 1 is provided for the upper end of the tube 1.

Individual food containers 7 are provided which are substantially cylindrical in form and are formed of any suitable or desirable material such, for example, as waxed paper or card-board to provide a fluid-tight receptacle to receive the different articles of food. At the upper end each of the individual containers 7 is provided with an outwardly extending flange 8 which is of substantially the same diameter as the interior diameter of the tube 1 so that when the containers 7 are positioned within the tube 1, there are formed isolated insulating chambers 9 and 10 which provide insulating means for preventing a transfer of heat from within the containers 7 to the exterior of the tube 1, and also prevent circulation of air between the chambers 9 and 10.

The bottom of one container 7 fits within and is supported by the curved portion 11 of the flange 8 of the container 5 immediately below it. In this manner each container 7 forms a cover for the container 7 lying immediately below it. The tube 1 may be of any suitable or desirable length and may be formed of a sufficient length to take a plurality of containers 7 and when a lesser number of containers 7 are desired by a particular purchaser, the tube 1 may be cut off so as to accommodate just the correct number of containers 7 to carry the food as required. In this manner it is possible to provide a container from a tube 1 while providing only a minimum number of lengths of tubes 1, thereby materially reducing the cost of the containers to the dispenser of the food.

Having fully described my invention, it is to be understood that I do not wish to be limited to the details herein set forth, but my invention is of the full scope of the appended claims.

I claim:

1. In a food container, the combination of a tube having a bottom and a cover, individual containers mounted within the tube and providing flanges at their upper ends, the upper container being seated upon the flange of the lower container and providing a cover for the lower container, and the flanges of the containers forming isolated air chambers within the outer container.

2. In a device of the class described, the combination of a tube, a bottom secured to the tube, insulating material mounted on the bottom, a plurality of individual food containers mounted within the first said container, and each of the said food containers providing outwardly extending flanges at their upper ends forming isolated insulating chambers within said tube.

Signed at Los Angeles, Calif., this 26th day of May, 1928.

DONALD WHITTIER.